United States Patent [19]

Overley

[11] Patent Number: 5,485,572
[45] Date of Patent: Jan. 16, 1996

[54] RESPONSE STACK STATE VALIDATION CHECK

[75] Inventor: Michael R. Overley, Maple Grove, Minn.

[73] Assignee: Unisys Corporation, Blue Bell, Pa.

[21] Appl. No.: 233,383

[22] Filed: Apr. 26, 1994

[51] Int. Cl.[6] .................................................. G06F 11/00
[52] U.S. Cl. ........................ 395/182.19; 371/31.1; 371/40.1; 364/243; 364/242.91; 364/243.44; 364/247.7; 364/266.3
[58] Field of Search .................... 395/575, 375, 395/400, 425, 182.19, 182.03, 183.18; 371/40.1, 21.1, 38.1, 40.3, 2.2; 364/242.91, 243, 243.1, 266.3, 243.44, 247.7

[56] References Cited

U.S. PATENT DOCUMENTS

| | | | |
|---|---|---|---|
| 3,913,074 | 10/1975 | Homberg et al. | 395/375 |
| 4,319,342 | 3/1982 | Johnson et al. | 395/425 |
| 4,398,224 | 8/1983 | Watanabe | 371/38.1 |
| 4,517,154 | 5/1985 | Dennis et al. | 376/259 |
| 4,682,284 | 7/1987 | Schrofer | 371/21.1 |
| 4,727,544 | 2/1988 | Bruner et al. | 371/21.1 |
| 4,783,732 | 11/1988 | Morton | 395/425 |
| 4,910,666 | 3/1990 | Nibby, Jr. et al. | 364/265 |
| 4,914,576 | 4/1990 | Zelley et al. | 364/200 |
| 5,048,022 | 9/1991 | Bissett et al. | 371/40.1 |
| 5,341,487 | 8/1994 | Derwin et al. | 395/425 |
| 5,406,504 | 4/1995 | Denisco et al. | 395/425 |
| 5,452,418 | 9/1995 | Tatosian et al. | 395/250 |

*Primary Examiner*—Robert W. Beausoliel, Jr.
*Assistant Examiner*—Dieu-Minh Le
*Attorney, Agent, or Firm*—Nawrocki, Rooney & Sivertson

[57] ABSTRACT

A response stack validation checking circuit for providing a hardware based approach for monitoring the integrity of a read and a write pointer in a memory stack. The present invention may be utilized in systems having a common memory controller for controlling the read and write pointers or a system having a number of asynchronous memory controllers, wherein each controller controls a different pointer. The present invention allows the memory controller elements to be less complex than a software based approach and therefore may reduce the physical space and power required by the memory controllers. Finally, the present invention may monitor the integrity of the read and write pointers in parallel with the memory controllers and in real time thereby not slowing down system performance.

5 Claims, 7 Drawing Sheets

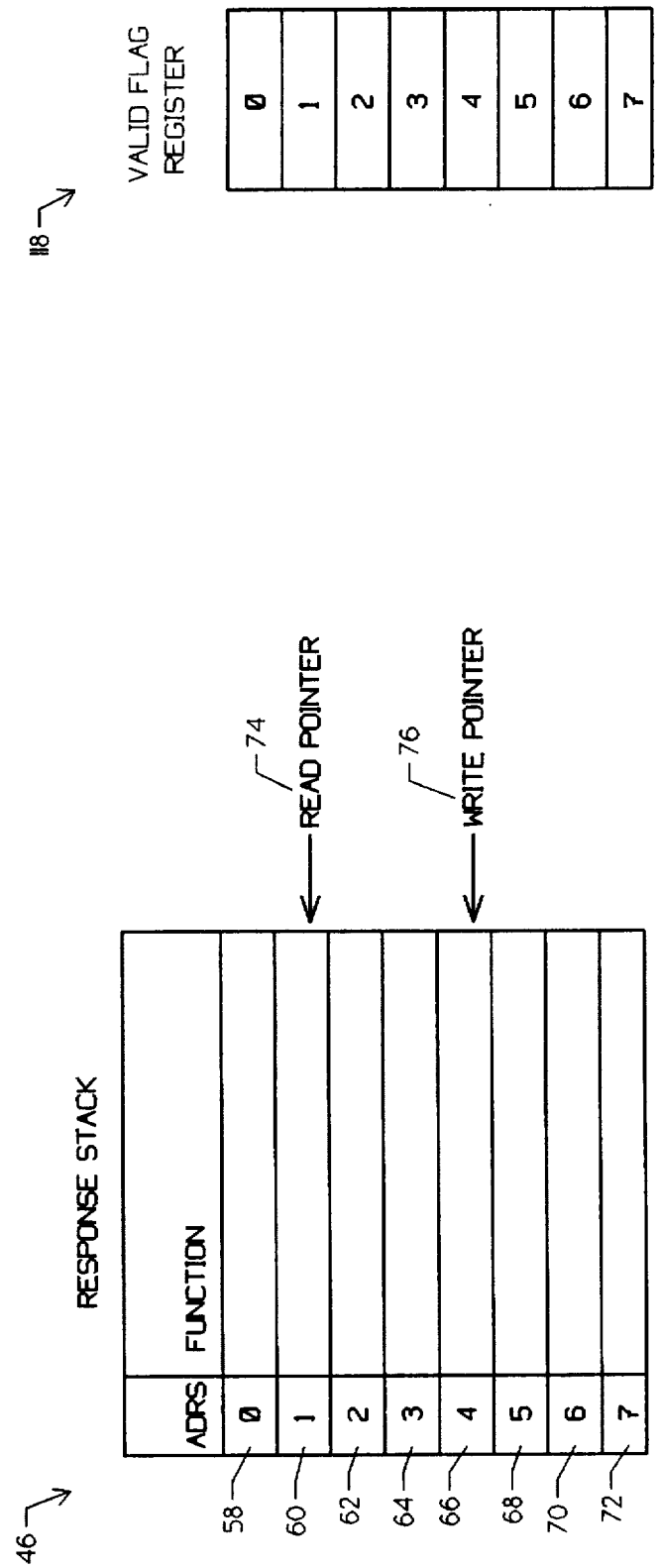

1

RESPONSE STACK STATE VALIDATION CHECK

CROSS REFERENCE TO CO-PENDING APPLICATIONS

This invention is related to commonly assigned U.S. patent application Ser. No. 08/173,429, filed Dec. 23, 1993, and entitled "Architecture for smart control of Bi-Directional transfer of Data", which is expressly incorporated herein by reference.

BACKGROUND OF THE INVENTION

1. Field of the Invention

The present invention is generally related to digital computers that utilize a memory stack and more particularly relates to means for checking the validity of the operation of the memory stack.

2. Description of the Prior Art

A key element in the design of high reliability computer systems is error detection. The term "error detection" refers to the detection of errors within a computer system before the errors adversely affect the arithmetic operations within the computer system. Many of today's computer systems incorporate some form of error detection to achieve improved reliability.

Large scale error detection has proved to be expensive to implement and maintain. In response thereto, many computer designers are limiting the use of error detection to portions of the computer system that can provide the most benefit. Memory elements are historically one place where error detection is targeted. Errors that occur either internal to a memory element or adjacent to the inputs or outputs of a memory element are far more likely to adversely affect the arithmetic operations within the computer system than those that occur in combinational logic. Memory elements must "store" data for later use whereas combinational logic merely operates on data in real time.

A specific type of memory element that is of interest is a memory stack. A memory stack contains a number of memory locations wherein each memory location may be accessed via a number of address busses. The address busses are typically called pointers. A typical memory stack may contain a read pointer and a write pointer for reading and writing data to the memory stack. In a typical system, a memory controller may cause one or more data words to be written into a series of address locations using the write pointer. At a later time, the memory controller may cause the previously written data elements to be read from the memory stack using the read pointer.

In one type of memory stack, called a first-in-first-out (FIFO) stack, the write pointer is incremented as data is written into the stack. Similarly, when reading data from the stack, the read pointer is incremented through the same memory locations as the write pointer passed through and in the same order, thus causing the first data element that is written to the FIFO stack to also be the first element that is read from the FIFO stack.

The absolute address location that is written or read via the write and read pointers is not important in a FIFO stack configuration. Rather, the relative difference between the write pointer and the read pointer is what defines valid data. The write and read pointers are typically generated by counters whereby the counters have a predetermined width. The width of the counters may be selected such that the counters have the same number of states as the corresponding response stack. In this way, the counters can be incremented such that the pointer address travels from a zero address to the maximum address of the memory element and then back to the zero address.

Memory stack elements are commonly used throughout modern day computer systems. One common application for a memory stack is to buffer data between two asynchronous devices. For example, a first device may write data into a memory stack even though the second device may not be prepared to read the data. Similarly, the second device may read the previously written data from the memory stack even though the first device may not be prepared to write data. Used in this manner, data may be transferred from a first asynchronously timed device to a second asynchronously timed device.

Several problems may occur in the operation of a memory stack which may cause unwanted errors within a high reliability computer system. Problems of data integrity within the memory stack itself can usually be handled using conventional redundancy or parity techniques. However, these techniques may not be very effective when dealing with functional problems such as improper read and write pointer operation. That is, parity and redundancy may rarely be used to detect the class of errors resulting from a memory controller improperly incrementing a read pointer to a location within the memory stack that has not yet been written using a write pointer. These problems stem primarily from the improper management of the read and write pointers of the memory stack.

In addition to the problems discussed above, several other problems may result from the improper management of the read and write pointers of a memory stack. First, the write pointer may be incremented to a location that contains data which has not yet been read by the read pointer. This may cause previously written data to be lost. Second, the read pointer may be incremented to a location which has not yet been written by the write pointer. This may cause invalid data to be propagated into the computer system. Third, the read pointer and the write pointer may attempt to simultaneously read and write a single address within the memory stack. This may cause invalid data to be read from or written to the specified address location within the memory stack.

Although the problems discussed above can be serious in a system having a common memory controller, the problems may be exacerbated when the read pointer and the write pointer are not controlled by a common memory controller. In some systems, the read pointer may be controlled by a first memory controller and the write pointer may be controlled by a second memory controller. The first memory controller and the second memory controller may be asynchronous relative to one another and may not communicate with one another with respect to valid read and write operations.

A consequence of having these problems within a high reliability computer system can be problematic. As stated above, convention error detection and correction techniques have proved to be inadequate. Prior attempts to manage the read and write pointers in an attempt to avoid these problems have primarily focused on software based solutions. Software based solutions are complex and require a significant amount of memory and processing power within the memory controllers. In addition, software based solutions can slow down system performance by requiring validity checks between each read or write operation.

SUMMARY OF THE INVENTION

The present invention overcomes the disadvantages found in the prior art by providing a hardware based approach for monitoring the integrity of a read and a write pointer in a memory stack. The present invention may be utilized in systems having a common memory controller for controlling the read and write pointers or a system having a number of asynchronous memory controllers, wherein each controller controls a different pointer. The present invention allows the memory controller elements to be less complex than a software based approach and therefore may reduce the physical space and power required by the memory controllers. Finally, the present invention may monitor the integrity of the read and write pointers in parallel with the memory controllers and in real time thereby not slowing down system performance.

In an exemplary embodiment of the present invention, a response stack having a read pointer and a write pointer is controlled by two asynchronous memory controllers. The first memory controller controls the read pointer and the second memory controller controls the write pointer. A valid flag register is provided having a number of valid flag bits wherein each valid flag bit corresponds to one address location in the response stack. When an address location is written using the write pointer, the corresponding valid flag bit in the valid flag register is also set. The valid flag bit indicates that valid data is stored at the corresponding location in the response stack. Similarly, when an address location is read using the read pointer, the corresponding valid flag bit in the valid flag register is cleared thereby indicating that the data from that location has been read. Although the exemplary embodiment contains a response stack, it is recognized, that the present invention may be used with any type of memory device having at least one read pointer and write pointer.

Three Valid Flag Error registers are provided in the exemplary embodiment of the present invention. These include the SET VALID FLAG ERROR register, the CLEAR VALID FLAG ERROR register, and the CONTROL VALID FLAG ERROR register. Each of these error registers have a number of Valid Flag Error bits and each of the Valid Flag Error bits within each register correspond to one address location in the response stack.

An exemplary embodiment of the present invention comprises a hardware circuit for checking a number of errors in the operation of a response stack. First, the exemplary embodiment checks for an attempt to write to a response stack location that already has a valid data entry as indicated by the corresponding valid flag bit. If this condition is detected, a SET VALID FLAG ERROR bit corresponding to the response stack location is set and transmitted to the memory controllers. Second, the exemplary embodiment checks for an attempt to read a location within the response stack that has not been previously written as indicated by the corresponding valid flag bit. If this condition is detected, a CLEAR VALID FLAG ERROR bit corresponding to the response stack location is set and transmitted to the memory controllers. Finally, the exemplary embodiment checks for an attempt to simultaneously read from and write to the same address location within the response stack thereby attempting to set and clear the same corresponding valid flag bit. If this condition is detected, a CONTROL VALID FLAG ERROR bit corresponding to the response stack location is set and transmitted to the memory controllers.

The exemplary embodiment of the present invention described above provides a comprehensive error detection and correction apparatus for use with a response stack element. The read and write pointers of the response stack are managed such that the integrity of data within the response stack is maintained. This may be accomplished for systems with either synchronous or asynchronous memory controllers. Finally, the exemplary embodiment of the present invention may improve the speed of the memory controllers and may reduce the physical space and power required by the memory controllers over a software based approach.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 4 is a block diagram of a Response Stack;

FIG. 5 is a block diagram of the Valid Flag Register;

DETAILED DESCRIPTION OF THE PREFERRED EMBODIMENT

Figure 1:
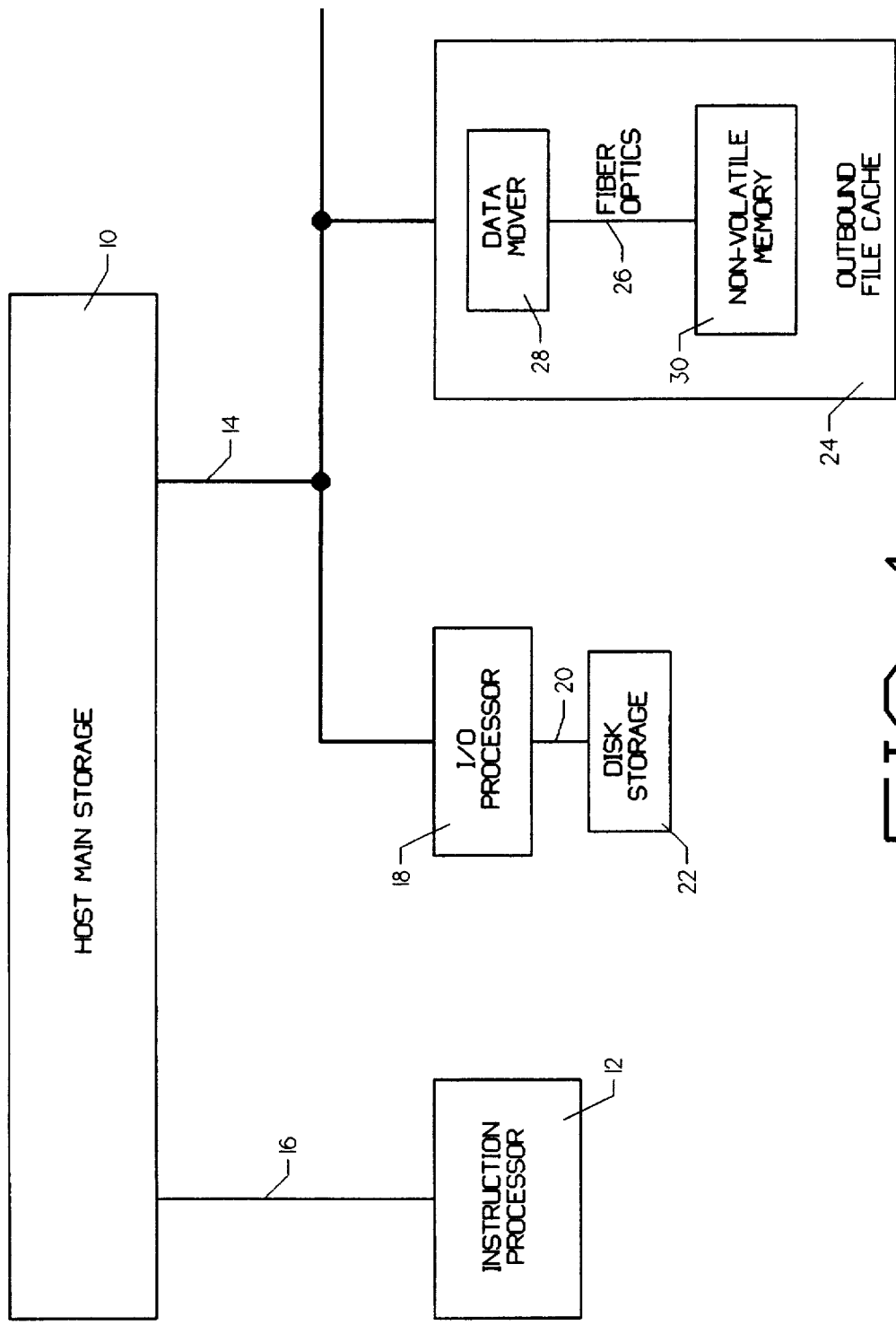
FIG. 1 is a block diagram of the Extended Processor Complex (XPC)

FIG. 1 is a block diagram of the extended processor complex (XPC). The preferred mode of the present invention is adapted to the XPC system. It is recognized, however, that the teachings of the present invention apply to other systems as well.

The XPC system comprises an instruction processor 12, an IO processor 18, a disk storage 22, an Outbound File Cache 24, and a host main storage 10. Instruction processor 12 receives instructions from host main storage 10 via interface 16. Host main storage 10 is also coupled to MBUS 14. I/O processor 18 is coupled to MBUS 14 and is further coupled to disk storage 22 via interface 20. Outbound File Cache block 24 is also coupled to MBUS 14. Outbound File Cache block 24 comprises a data mover 28 and a nonvolatile memory 30. Data mover 28, which is the primary focus of the preferred embodiment of this invention, is coupled to nonvolatile memory 30 via fiber-optic cable 26. Data is transferred from the disk storage 22 through I/O processor 18 to host main storage 10. But now, any updates that occur to the data are stored in the Outbound File Cache 24 nonvolatile memory 30 instead of disk storage 22, at least momentarily. All future references access the data in nonvolatile memory 30. Therefore, nonvolatile memory 30 acts like a cache for the disk and significantly increases data access speeds.

Only after the data is no longer being used by the system is it transferred back to disk storage 22. In Outbound File Cache 24, data mover 28 is used to transmit data from host main storage 10 to nonvolatile memory 30 and vice versa. It is contemplated that a plurality of data mover elements may be placed in one Outbound File Cache 24. It is further recognized that a plurality of Outbound File Cache elements 24 may be coupled to MBUS 14. For clarity, only one Outbound File Cache element 24 and one data mover 28 are illustrated in FIG. 1.

Figure 2:
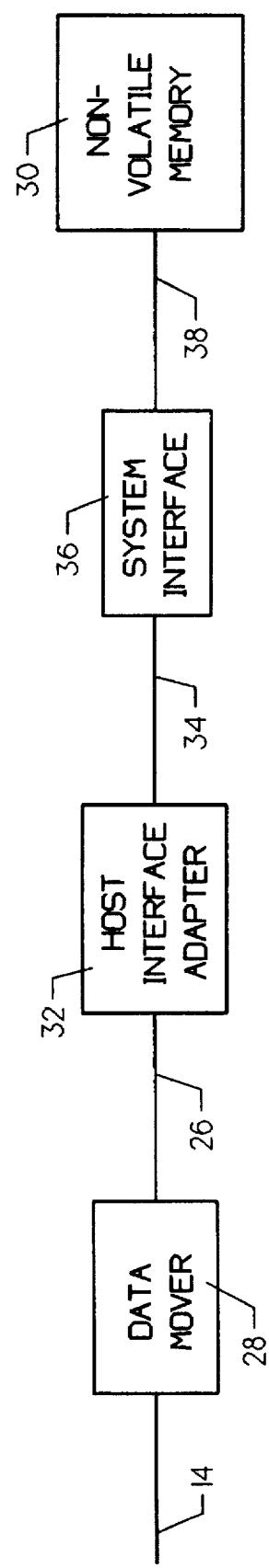
FIG. 2 is a block diagram of the Outbound File Cache Block.

FIG. 2 is a block diagram of the Outbound File Cache block 24 (see FIG. 1). Within Outbound File Cache block 24, additional components may be used to interface with nonvolatile memory 30. These components may include a host interface adaptor 32 and a system interface 36. Data mover 28 is coupled to MBUS 14 and further coupled to host interface adaptor 32 via fiber-optic interface 26. System interface 36 is coupled to host interface adaptor 32 via interface 34 and further coupled to nonvolatile memory 30 via interface 38. For every data mover 28, there may be a host interface adaptor 32 and system interface 36 added to the system. As more and more data movers 28 are added to the system, it becomes apparent that a bottleneck may occur in requests to nonvolatile memory 30. As a result, the size of nonvolatile memory 30 and the necessary bandwidth which is required to access this memory becomes a major performance concern. The XPC systems alleviates this problem by allowing a plurality of nonvolatile memory elements to be connected in parallel and further allows access to every nonvolatile memory element from every input port.

On each system interface card 36, a processor called an index processor (IXP) is used to manage the caching function (just one of the IXP's functions). The index processor also has a path to nonvolatile memory 30. Further discussion of the details of the XPC system are contained in the incorporated reference.

Figure 3:
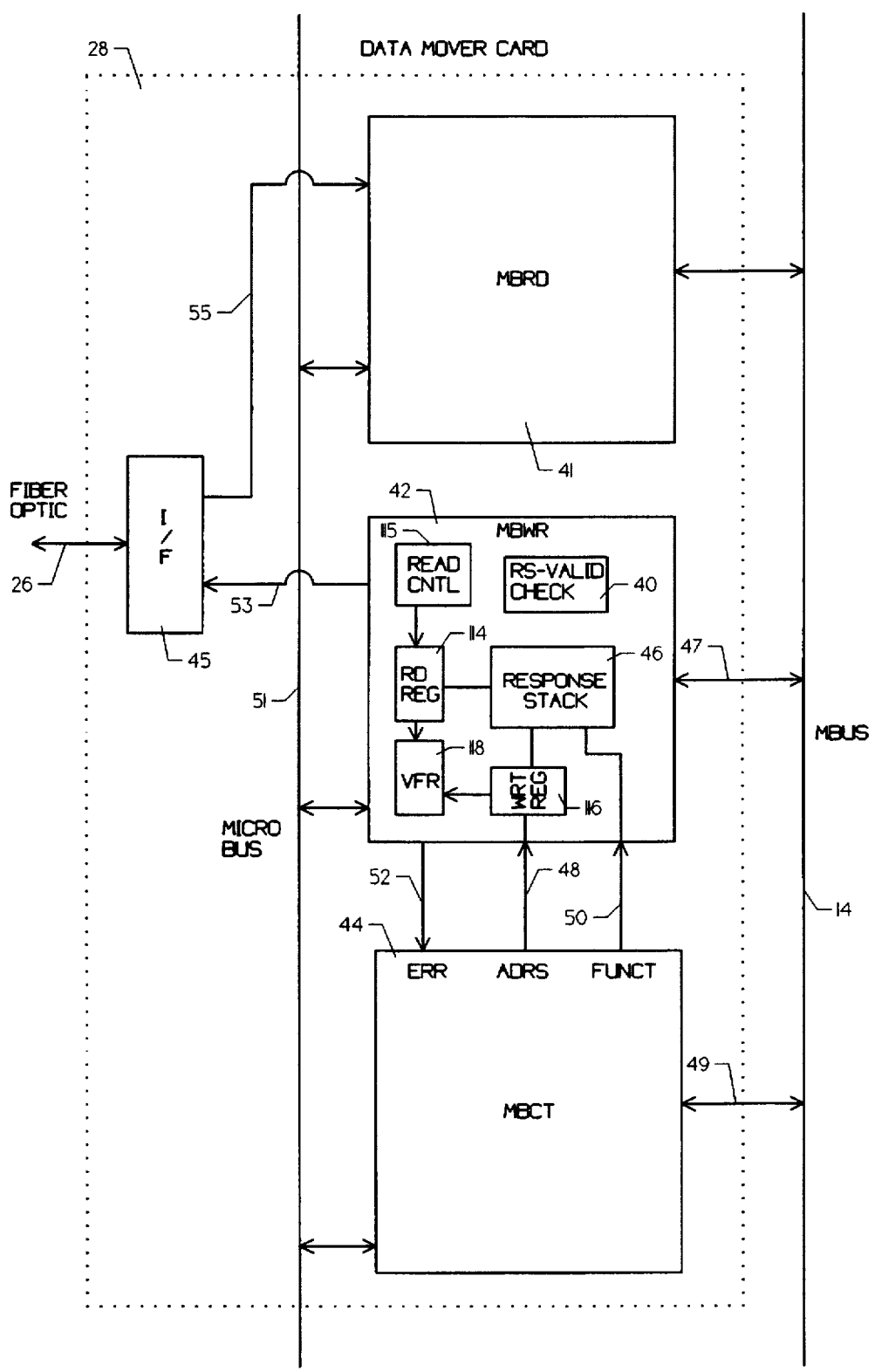
FIG. 3 is a block diagram of the pertinent hardware in the Data mover card.

FIG. 3 is a block diagram of the pertinent hardware in the data mover card. Although Data mover 28 may comprise additional hardware, for clarity FIG. 3 only illustrates the hardware that is necessary for the understanding of the present invention.

The Data mover 28 comprises a MBRD 41, a MBWR 42, a MBCT 44, and an I/F 45. In the exemplary embodiment of the present invention, MBWR 42, MBCT 44, and MBRD 41 each may be a very large scale integrated circuit (VLSI). MBWR 42 is coupled to MBUS 14 via interface 47. MBWR 42 receives data from host main storage 10 via MBUS 14. MBWR 42 may have a response stack 46 comprised therein. In the exemplary embodiment of the present invention, response stack 46 is an 8-deep read/write stack configured in a first-in-first-out (FIFO) configuration. Response stack 46 may have a read pointer and a write pointer. In this configuration, the write pointer may be incremented as data is written into response stack 46. Similarly, when reading the stack, the read pointer may be incremented through the same memory locations as the write pointer passed through and in the same order, thus causing the first data element that is written into the FIFO stack to also be the first element that is read from the FIFO stack. It is recognized that the present invention may be used with any type of memory element that has a read pointer and a write pointer. More specifically, the present invention may be used when it is important to not to over-write data within a memory element or read invalid data from a memory element.

The read pointer may be stored in a read address register 114 and controlled by a read controller 115. The write pointer may be stored in a write address register 116 and controlled by a write control circuit located in MBCT 44. Therefore, in the exemplary embodiment, the read pointer is controlled by circuitry contained in MBWR 42, and the write pointer is controlled by circuitry contained in MBCT 44.

The absolute address location that is written or read via the write and read pointers is not important in a FIFO stack configuration. Rather, the relative difference between the write pointer and the read pointer is what defines valid data. The write and read pointers are typically generated by counters, whereby the counters have a predetermined width. The width of the counters may be selected such that the counters have the same number of states as the corresponding response stack 46. In this way, the counters can be incremented such that the pointer address travels from a zero address to the maximum address of the response stack 46 and then back to the zero address. It is recognized that the read and write pointers may not "increment" as described above but rather may be controlled by a more sophisticated algorithm and still be within the scope of the present invention.

A valid flag register 118 may be included within MBWR 42. Valid flag register 118 may have a number of valid flag bits. Each valid flag bit may correspond to one address location in response stack 46. When an address location is written using the write pointer, a corresponding valid flag bit in valid flag register 118 may also be set. The valid flag bit indicates that valid data is stored at the corresponding location in response stack 46. Similarly, when an address location is read using the read pointer, a corresponding valid flag bit in valid flag register 118 is cleared, thereby indicating that the data in that location has been read. Valid flag register 118 is coupled to read address register 114 and write address register 116.

A response-stack-valid-check 40 is also included in MBWR 42 in the exemplary embodiment of the present invention. Response-stack-valid-check 40 is at the heart of the present invention. Response-stack-valid-check 40 monitors the read pointer and the write pointer of response stack 46, and determines when a predetermined error occurs.

In the exemplary embodiment, response-stack-valid-check 40 checks for an attempt to write to a response stack location that already has a valid data entry as indicated by the corresponding valid flag bit in valid flag register 118. If this condition is detected, a SET VALID FLAG ERROR bit corresponding to the response stack location is set and transmitted to the memory controllers. The exemplary embodiment of response-stack-valid-check 40 also checks for an attempt to read a location within response stack 46 that has not been previously written as indicated by the corresponding valid flag bit in valid flag register 118. If this condition is detected, a CLEAR VALID FLAG ERROR bit corresponding to the response stack location is set and transmitted to the memory controllers. Finally, the exemplary embodiment of response-stack-valid-check 40 checks for an attempt to simultaneously read from and write to the same address location within response stack 46, thereby attempting to set and clear the same corresponding valid flag bit within valid flag register 118. If this condition is detected, a CONTROL VALID FLAG ERROR bit corresponding to the response stack location is set and transmitted to the memory controllers. It is recognized that the present invention may be used to detect other memory stack errors as well.

MBCT 44 is coupled to MBUS 14 via interface 49. MBCT 44 controls the requests made on MBUS 14 for data mover 28. MBCT 44 supplies a function to response stack 46 via interface 50. MBCT 44 also supplies a write pointer address to write register 116 via interface 48. MBCT 44 receives a number of error flag signals from MBWR 42 via interface 52. These error flag signals include the CLEAR VALID FLAG ERROR, the SET VALID FLAG ERROR, and the CONTROL VALID FLAG ERROR as discussed above. Finally, MBCT 44 is coupled to micro-bus 51 for local communication.

MBWR 42 receives data from MBUS 14 and sends the data to a specified destination within the XPC system. MBWR 42 is coupled to a fiber optic interface block 45 via interface 53. Fiber optic interface block 45 is coupled to host interface adapter 32 via interface 26 (see FIG. 2). Fiber optic interface block 45 may receive data from host interface adapter 32 via interface 26 and may transmit that data to MBRD 41 via interface 55. MBRD 41 may transmit the data to MBUS 14.

FIG. 4 is a block diagram of a response stack. In the exemplary embodiment of the present invention, response stack 46 comprises an 8-deep storage area for storing functions provided by MBCT 44 (see FIG. 3). Each of the eight storage locations within response stack 46 may be uniquely addressed via addresses 58, 60, 62, 64, 66, 68, 70 and 72. Response stack 46 may be read using a read pointer 74. Likewise, response stack 46 may be written using a write pointer 76. In the exemplary embodiment of the present invention, response stack 46 is used in a FIFO configuration. Therefore, the write pointer may be incremented as data is written into the stack. Similarly, when reading the stack, the read pointer may be incremented through the same memory locations as the write pointer pass through and in the same order, thus causing the first data element that is written to the FIFO response stack 46 to also be the first element that is read from the FIFO response stack 46.

In this configuration, the absolute address location that is written or read via the write and read pointers is not important. Rather, the relative difference between the write pointer and the read pointer is what defines valid data. The write and read pointers are typically generated by counters, whereby the counters have a predetermined width. The width of the counters may be selected such that the counters have the same number states as the corresponding response stack 46. In this way, the counters can be incremented such that the pointer address travels from a zero address to the maximum address of response stack 46 and then back to the zero address. However, it is recognized that other means may be used to generate the read and write pointers.

FIG. 5 is a block diagram of the valid flag register of the exemplary embodiment. Valid flag register 118 may have a number of valid flag bits contained therein such that each valid flag bit corresponds to one address location in response stack 46.

Referring to FIG. 5, the numbers contained in each bit of valid flag register 118 correspond to one and only one address location of response stack 46 (see FIG. 4). Therefore, when an address location of response stack 46 is written using the write pointer, the corresponding valid flag bit in valid flag register 118 is also set. In this situation, the valid flag bit indicates that valid data is stored at the corresponding location in response stack 46. Similarly, when an address location within response stack 46 is read using the read pointer, the corresponding valid flag bit in valid flag register 118 is cleared, thereby indicating that the data from that location has been read.

Figure 6:
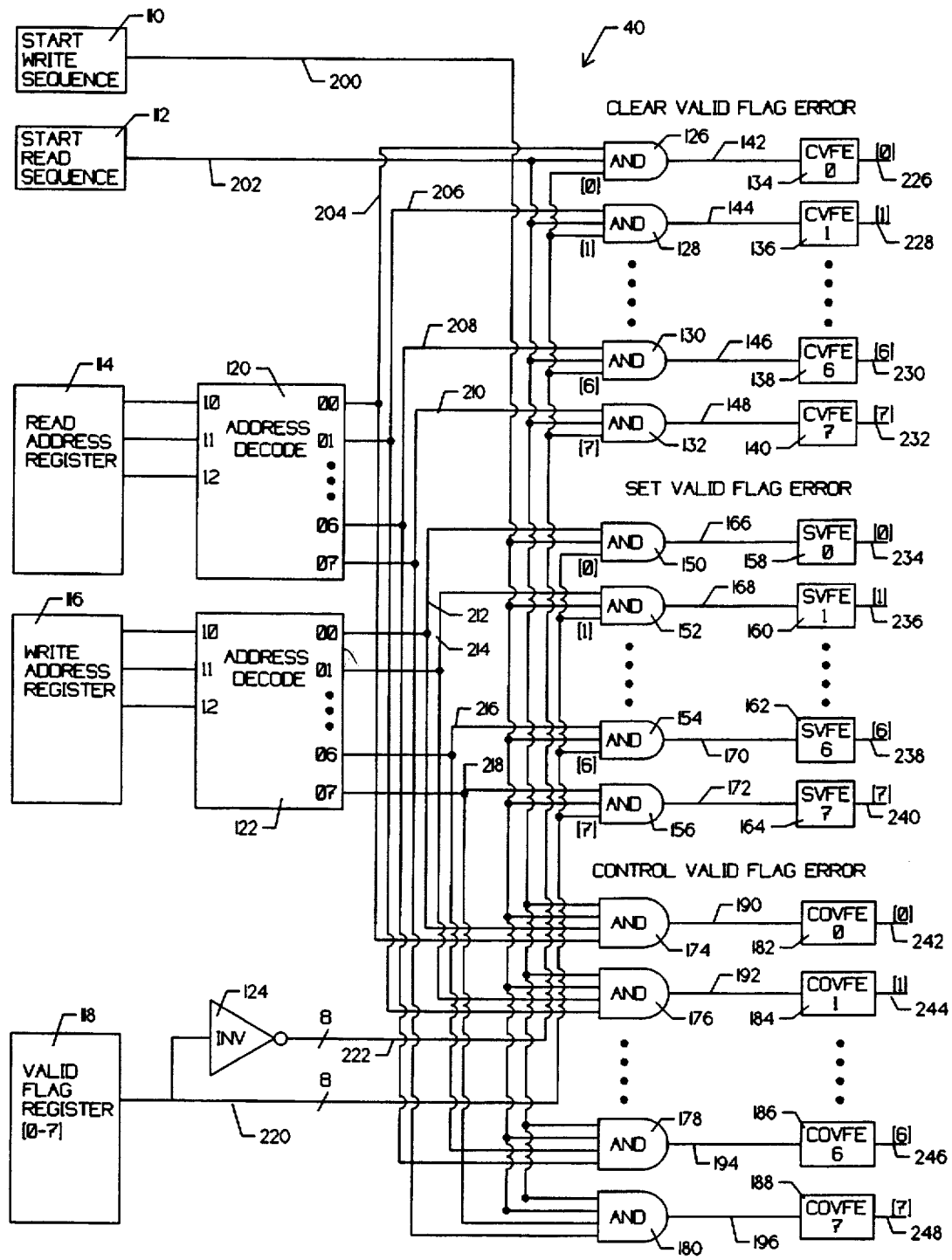
FIG. 6 is a detailed block diagram of the Response Stack State Validation Check hardware.

FIG. 6 is a detailed block diagram of the response stack state validation check hardware. In the exemplary embodiment, response-stack-state-validation-check 40 is coupled to read address register 114, write address register 116, and valid flag register 118. (See FIG. 3) Address decoder 120 may be coupled to read address register 114. Address decoder 120 decodes a three-bit read address into eight read decoded bits. Address decoder 122 may be coupled to write address register 116. Address decoder 122 decodes a three-bit write address into eight write decoded bits. Valid flag register 118 provides eight valid flag register bits onto interface 220. Inverter 124 is coupled to valid flag register 118 via interface 220. Inverter 124 provides the inversion of the bits contained in valid flag register 118 on interface 222.

Start write sequence 110 asserts interface 200 when a write sequence is begun. Start read sequence 112 asserts interface 202 when a read sequence is begun. In the exemplary embodiment, start write sequence 110 is controlled by a first memory controller and start read sequence 112 is controlled by a second memory controller. It is recognized that the present invention may also work within a single memory controller system.

Three valid flag error registers are provided in the exemplary embodiment of the present invention. These are a SET VALID FLAG ERROR register, a CLEAR VALID FLAG ERROR register, and a CONTROL VALID FLAG ERROR register. Each of these "error" registers have a number of valid flag error bits. Each of the valid flag error bits within each register correspond to one address location in response stack 46.

Referring to FIG. 6, the circuitry generating the respective valid flag errors are separated out and placed under an appropriate heading. In the upper right hand corner of FIG. 6, AND gates 126, 128, 130, and 132 are used to generate CLEAR VALID FLAG ERROR register bits. AND gate 126 has a first input that is coupled to a "00" output port of address decoder 120 via interface 204. AND gate 126 has a second input that is coupled to start read sequence 112 via interface 202. AND gate 126 has a third input which is coupled to a bit-0 output of inverter 124 via interface 222. The output of AND gate 126 is coupled to a clear valid flag error flip-flop 134 via interface 142.

AND gate 128 has a first input which is coupled to a "01" output of address decoder 120 via interface 206. AND gate 128 has a second input which is coupled to start-read sequence 112 via interface 202. AND gate 128 has a third input which is coupled to a "bit-1" output of inverter 124 via interface 222. The output of AND gate 128 is coupled to a clear valid flag error flip-flop 136 via interface 144.

The circuitry used for generating bits 2–5 of CLEAR VALID FLAG ERROR register has been omitted from FIG. 6 because it is merely repetitive and is not necessary for the understanding of the present invention. AND gate 130 has a first input coupled to a "06" output of address decoder 120 via interface 208. AND gate 130 has a second input which is coupled to start-read sequence 112 via interface 202. AND gate 130 has a third input which is coupled to a "bit-6" output of inverter 124 via interface 222. AND gate 130 is coupled to a clear valid flag error flip-flop 138 via interface 146.

AND gate 132 has a first input which is coupled to the 07 output of address decoder 120 via interface 210. AND gate 132 has a second input which is coupled to start-read-sequence 112 via interface 202. AND gate 132 has a third input which is coupled to "bit-7" of inverter 124 via interface 222. AND gate 132 is coupled to clear valid flag error flip-flop 140 via interface 148.

The CLEAR VALID FLAG ERROR register is made up of clear valid flag error flip-flops 134, 136, 138 and 140.

Referring to the middle portion of FIG. 6, AND gates 150, 152, 154, and 156 are used to generate SET VALID FLAG ERROR register bits. AND gate 150 has a first input that is coupled to a "00" output port of address decoder 122 via interface 212. AND gate 150 has a second input that is coupled to start-write-sequence 110 via interface 200. AND gate 150 has a third input which is coupled to a bit-0 output of inverter 124 via interface 222. The output of AND gate 150 is coupled to a set valid flag error flip-flop 158 via interface 166.

AND gate 152 has a first input which is coupled to a "01" output of address decoder 122 via interface 214. AND gate 152 has a second input which is coupled to start-write-sequence 110 via interface 200. AND gate 128 has a third input which is coupled to a "bit-1" output of inverter 124 via interface 222. The output of AND gate 152 is coupled to a set valid flag error flip-flop 160 via interface 168.

The circuitry used for generating bits 2–5 of SET VALID FLAG ERROR register has been omitted from FIG. 6 because it is merely repetitive and is not necessary for the understanding of the present invention. AND gate 154 has a first input coupled to a "06" output of address decoder 122 via interface 216. AND gate 154 has a second input which is coupled to start-write-sequence 110 via interface 200. AND gate 154 has a third input which is coupled to a "bit-6" output of inverter 124 via interface 222. AND gate 154 is coupled to a set valid flag error flip-flop 162 via interface 170.

AND gate 156 has a first input which is coupled to the "07" output of address decoder 122 via interface 218. AND gate 156 has a second input which is coupled to start-write-sequence 110 via interface 200. AND gate 156 has a third input which is coupled to "bit-7" of inverter 124 via interface 222. AND gate 156 is coupled to set valid flag error flip-flop 164 via interface 172.

The SET VALID FLAG ERROR register is made up of clear valid flag error flip-flops 158, 160, 162 and 164.

Referring to the lower right portion of FIG. 6, AND gates 174, 176, 178, and 180 are used to generate CONTROL VALID FLAG ERROR register bits. AND gate 174 has a first input that is coupled to a "00" output port of address decoder 122 via interface 212. AND gate 174 has a second input that is coupled to a "00" output port of address decoder 120 via interface 204. AND gate 174 has a third input that is coupled to start-write-sequence 110 via interface 200. AND gate 174 has a fourth input that is coupled to start-read-sequence 112 via interface 202. The output of AND gate 174 is coupled to a control valid flag error flip-flop 182 via interface 190.

AND gate 176 has a first input that is coupled to a "01" output port of address decoder 122 via interface 214. AND gate 176 has a second input that is coupled to a "01" output port of address decoder 120 via interface 206. AND gate 176 has a third input that is coupled to start-write-sequence 110 via interface 200. AND gate 176 has a fourth input that is coupled to start-read-sequence 112 via interface 202. The output of AND gate 176 is coupled to a control valid flag error flip-flop 184 via interface 192.

The circuitry used for generating bits 2–5 of SET VALID FLAG ERROR register has been omitted from FIG. 6 because it is merely repetitive and is not necessary for the understanding of the present invention. AND gate 178 has a first input that is coupled to a "06" output port of address decoder 122 via interface 216. AND gate 178 has a second input that is coupled to a "06" output port of address decoder 120 via interface 208. AND gate 178 has a third input that is coupled to start-write-sequence 110 via interface 200. AND gate 178 has a fourth input that is coupled to start-read-sequence 112 via interface 202. The output of AND gate 178 is coupled to a control valid flag error flip-flop 186 via interface 194.

AND gate 180 has a first input that is coupled to a "07" output port of address decoder 122 via interface 218. AND gate 180 has a second input that is coupled to a "07" output port of address decoder 120 via interface 210. AND gate 180 has a third input that is coupled to start-write-sequence 110 via interface 200. AND gate 180 has a fourth input that is coupled to start-read-sequence 112 via interface 202. The output of AND gate 180 is coupled to a control valid flag error flip-flop 188 via interface 196.

The CONTROL VALID FLAG ERROR register is made up of clear valid flag error flip-flops 182, 184, 186, and 188.

Figure 7A:
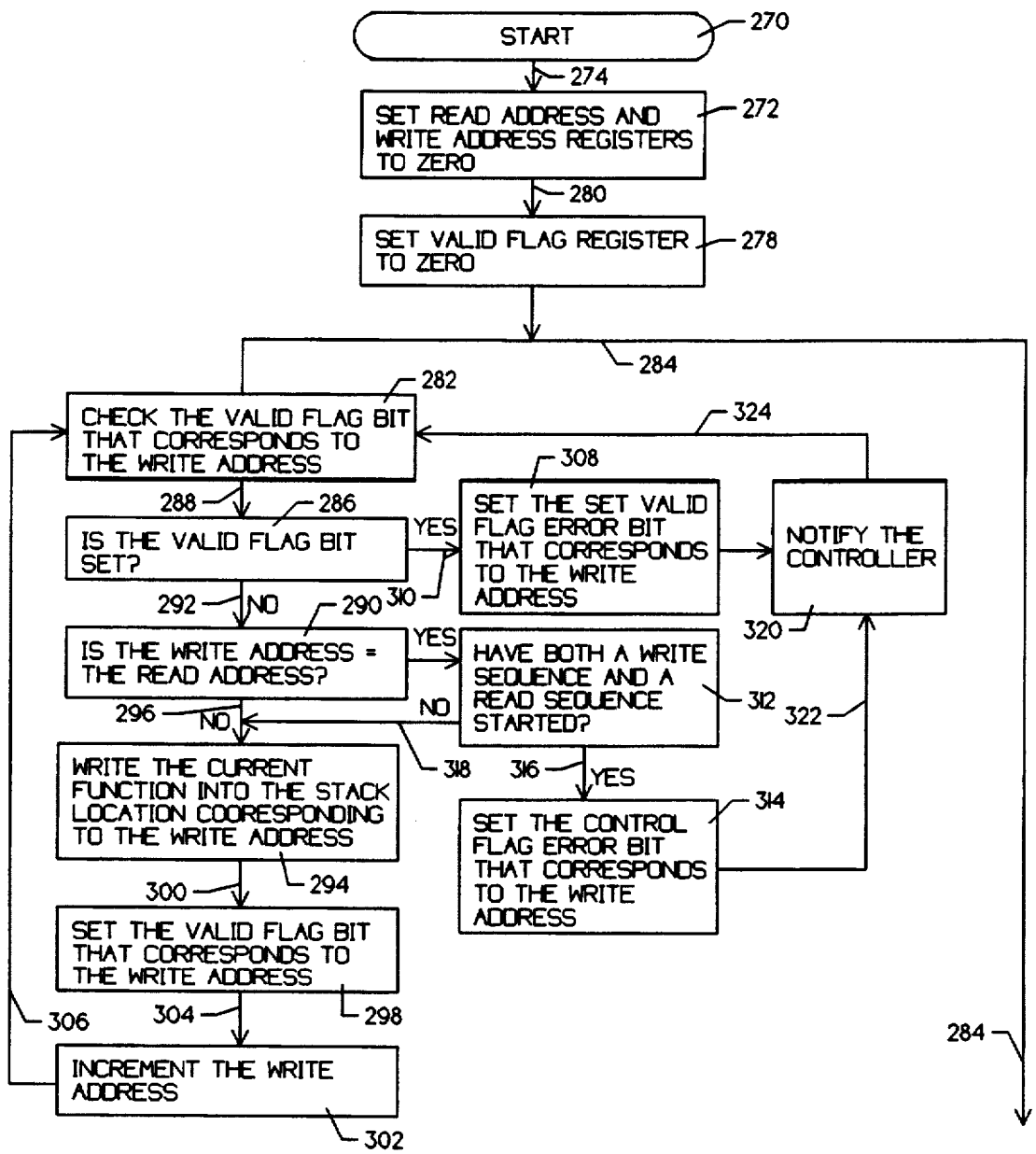
FIG. 7 is the first of two parts of a flow diagram showing the operation of an exemplary embodiment of the Response Stack State Validation Check hardware.
FIG. 7B is the second of two parts of a flow diagram showing the operation of an exemplary embodiment of the Response Stack State Validation Check hardware.

FIG. 7A is the first of two parts of a flow diagram showing the operation of an exemplary embodiment of the response stack state validation check hardware. The algorithm is entered at block 270 and control passes to block 272 via interface 274. Block 272 sets the read address register 114 and the write address register 116 to a value of zero. Control is then passed to block 278 via interface 280. Block 278 sets the valid flag register 118 to zero. Control is then passed simultaneously to block 282 and block 330 via interface 284. It is recognized that other methods may be used to initialize the hardware. In addition, it is not necessary for the present invention that control be passed simultaneously to blocks 278 and block 280. It is recognized that other methods may be used to accomplish the same or similar results.

Block 282 checks the valid flag register bit that corresponds to the write address. Control is then passed to block 286 via interface 288. Block 286 determines whether the valid flag bit checked in block 282 is set or not. If the valid flag bit in block 282 is set, control is passed to block 308 via interface 310. Block 308 sets the bit within SET VALID FLAG ERROR register that corresponds to the write address. Control is then passed to block 320. Block 320 notifies the memory controller and passes control back to block 282 via interface 324. This loop continues until block 286 determines that the valid flag bit that corresponds to the write address is not set. Once this occurs, control is passed to block 290 via interface 292. Block 290 determines whether the write address equals the read address. If the write address equals the read address, control is passed to block 312. Block 312 determines whether both a write sequence and a read sequence have been started. If both the write sequence and a read sequence have been started, control is passed to block 314 via interface 316. Block 314 sets a bit within the control flag error register that corresponds to the current write address. Control is then passed to block 320 via interface 322. Block 320 notifies the controller and passes control back to block 282 via interface 324.

Referring back to block 312, if both a write sequence and a read sequence have not been started, control is passed to block 294 via interface 318. Referring back to block 290, if the write address does not equal the read address, control is also passed to block 294 via interface 296. In any event, control is passed to block 294. Block 294 writes the function supplied by MBCT 44 into the stack location that corresponds to the current write address. Control is then passed to block 298 via interface 300. Block 298 sets the bit within valid flag register 118 that corresponds to the current write address. Control is then passed to block 302 via interface 304. Block 302 increments the write address and passes control back to block 282 via interface 306.

The two separate branches of the flow diagram beginning with block 282 and block 330 (see FIG. 7B) are operated in parallel in the exemplary embodiment of the present invention. Therefore, the operations of one branch may effect the operations of the other branch. In an exemplary embodiment of the present invention, one memory controller may control the branch beginning with block 282, while another memory controller may control the branch beginning with block 330. The branch beginning with block 282 and the branch beginning with block 330 may operate independently and asynchronously with respect to one another. It is recognized, however, that the present invention will work with synchronous memory controllers or a system utilizing a common memory controller configuration.

Figure 7B:
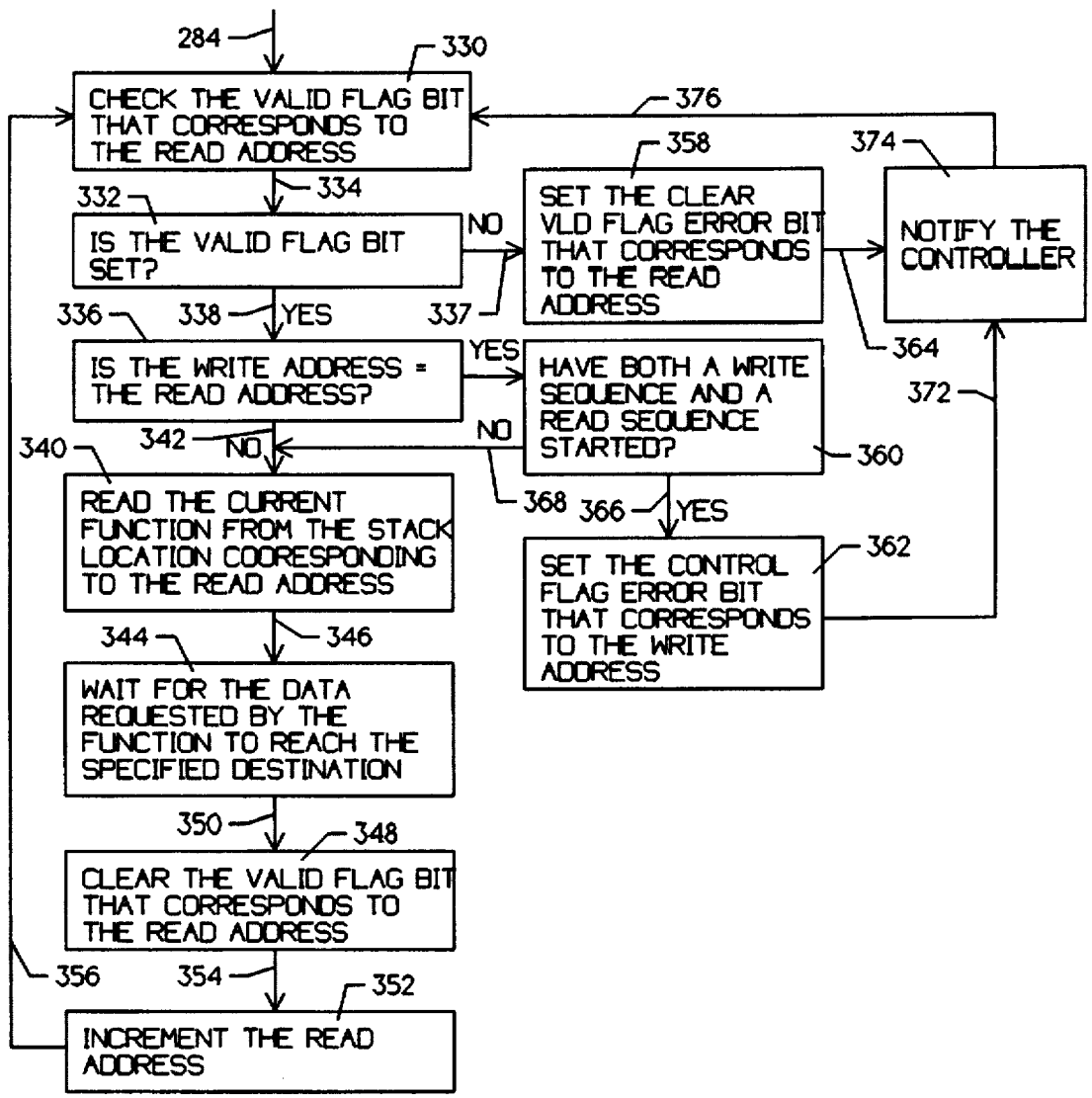

FIG. 7B is the second of two parts of a flow diagram showing the operation of an exemplary embodiment of the response stack state validation check hardware. As stated above, control is simultaneously passed to block 282 and block 330 via interface 284. Block 330 checks the valid flag bit contained in valid flag register 118 that corresponds to the present read address. Control is then passed to block 332 via interface 334. Block 332 determines whether the valid flag bit checked in block 330 is set. If the valid flag bit is not set, control is passed to block 358 via interface 337. Block 358 sets a bit within the clear valid flag error register that correspond to the read address. Control is then passed to block 374 via interface 364. Block 374 notifies the controller and passes control back to block 330 via interface 376.

Referring back to block 332, if the valid flag bit checked in block 330 is set, control is passed to block 336 via interface 338. Block 336 determines whether the write address equals the read address. If the write address does equal the read address, control is passed to block 360. Block 360 determines whether both a write sequence and a read sequence have started. If both a write sequence and a read sequence have started, control is passed to block 362 via interface 366. Block 362 sets a bit within control flag error register that corresponds to the write address. Control is then passed to block 374 via interface 372 wherein the controller is notified. Control is then passed back to block 330 via interface 376.

Referring back to block 360, if both a write sequence and a read sequence have not started, control is passed to block 340 via interface 368. Referring back to block 336, if the write address does not equal the read address, control is passed to block 340 via interface 342. In any event, control is passed to block 340. Block 340 reads the current function from the location in response stack 46 that corresponds to the read address. The function is then passed to MBUS 14 and then to host main storage 10. The function determines which data to retrieve from host main storage and the destination of the data. Control is then passed to block 344 via interface 346. Block 344 waits for the data requested by the function to reach the desired destination. Control is then passed to block 348 via interface 350. Block 348 clears the bit within valid flag register 118 that corresponds to the current read address. Control is then passed to block 352 via interface 354. Block 352 increments the read address and passes control back to block 330 via interface 356.

Having thus described the preferred embodiments of the present invention, those of skill in the art will readily appreciate that yet other embodiments may be made and used within the scope of the claims hereto attached.

I claim:

1. A method for checking integrity of a read and a write operation of a memory device, the read and write operation of the memory device being controlled by a memory controller and the memory device having a plurality of storage locations for storing a plurality of data elements, a corresponding data element stored in a particular one of the plurality of storage locations of the memory device being valid if a prior write operation is performed on the particular one of the plurality of storage locations and no later read operation is performed on the particular one of a plurality of storage location, a read address register is coupled to the memory device for storing a read address, each read address corresponding to one of the plurality of storage locations, and a write address register is coupled to the memory device for storing a write address, each write address corresponding to one of the plurality of storage locations, a valid flag register having a plurality of bits wherein each bit corresponds to one of the plurality of storage location in the memory device is coupled to the memory controller, the method comprising the steps of:

a. initializing the read address register, the write address register, and the valid flag register;

b. checking the valid flag register bit that corresponds to the one of the plurality of storage locations which corresponds to the write address;

c. determining if the valid flag bit checked in step (b) is set;

d. setting a bit in a set valid flag error register that corresponds to the one of the plurality of storage locations which corresponds to the write address if the determining step (c) determines that the valid flag bit is set;

e. notifying the memory controller of the error if step (d) set the corresponding bit in the set valid flag error register;

f. returning to step (b) after step (e);

g. determining if a write address in the write address register is equal to a read address in the read address register if step (c) determines that the valid flag bit is not set;

h. determining if both a write operation and a read operation are active if step (g) determines that the read address is equal to the write address;

i. setting a bit in a control valid flag error register that corresponds to the one of the plurality of storage locations which corresponds to the write address if the determining step (h) determines that both a read operation and a write operation have started;

j. notifying the memory controller of the error if step (i) set the corresponding bit in the control valid flag error register;

k. returning to step (b) after step (j);

l. writing a current function into the location in the memory device corresponding to the one of the plurality of storage locations which corresponds to the write address when a write operation begins if step (g) determines that the write address does not equal the read address or if step (h) determines that a write operation and a read operation are both not active;

m. setting a bit in the valid flag register that corresponds to the one of the plurality of storage locations which corresponds to the write address;

n. incrementing the write address; and o. returning to step (b).

2. A method according to claim 1 further comprising the steps of:

a. checking the valid flag register bit that corresponds to the one of the plurality of storage locations which corresponds to the read address after executing step (a) in claim 1;

b. determining if the valid flag bit checked in step a) is set;

c. setting a bit in a clear valid flag error register that corresponds to the one of the plurality of storage locations which corresponds to the read address if the determining step (b) determines that the valid flag bit is not set;

d. notifying the memory controller of the error if step c) set the corresponding bit in the clear valid flag error register;

e. returning to step (a) after step d);

f. determining if a read address in the read address register is equal to a write address in the write address register if step (b) determines that the valid flag bit is set;

g. determining if both a write operation and a read operation have begun if step (f) determines that the read address is equal to the write address;

h. setting a bit in a control valid flag error register that corresponds to the one of the plurality of storage locations which corresponds to the read address if the determining step (g) determines that both a read operation and a write operation have started;

i. notifying the memory controller of the error if step (h) set the corresponding bit in the control valid flag error register;

j. returning to step a) after step (i);

k. reading a current function into the location in the memory device corresponding to the one of the plurality of storage locations which corresponds to the read address when a read operation begins if step (f) determines that the write address does not equal the read address or if step (g) determines that a write operation and a read operation are both not active;

l. clearing a bit in the valid flag register that corresponds to the one of the plurality of storage locations which corresponds to the read address;

m. incrementing the read address; and n. returning to step (a).

3. An apparatus for checking integrity of a write operation of a memory device by controlling a read and a write pointer, the memory device being readable via a read operation, the memory device having a plurality of storage locations for storing a plurality of data elements, a corresponding data element stored in a particular one of the plurality of storage locations of the memory device being valid if a prior write operation is performed on the particular one of the plurality of storage locations and no later read operation is performed on the particular one of the plurality of storage locations, the apparatus comprising:

a. a memory controller coupled to the memory device for controlling the read and the write operation by controlling the read and write pointers;

b. first determining circuit coupled to said memory controller for determining whether the memory controller is performing a write operation on the particular one of the plurality of storage locations of the memory device when the particular one of the plurality of storage locations contains valid data;

c. the first determining circuit having a valid flag register coupled to the memory device, the valid flag register having a plurality of bits wherein each bit corresponds to a particular one of the plurality of storage locations in the memory device, the write operation of a said particular one of the plurality of storage location within the memory device by the memory controller sets the corresponding particular one of the plurality of bits in the valid flag register indicating valid data is contained therein;

d. the first determining circuit having a logic circuit coupled to said valid flag register and to the memory controller for determining whether the memory controller is performing a write operation on the particular one of the plurality of storage locations of the memory device that contains valid data therein;

e. the logic circuit having a write address register coupled to the memory controller for storing a write address pointer, the write address pointer identifies a particular one of the plurality of storage locations within the memory device;

f. the logic circuit having a write address decoder coupled to the write address register for decoding the write address pointer into a plurality of decode lines wherein each of the plurality of decode lines corresponds to one of the plurality of storage locations within the memory device;

g. the logic circuit having a start-write-sequence line provided by the memory controller, the memory controller asserting the start-write-sequence line whenever a write sequence is started;

h. the logic circuit having a plurality of and-gates, each and-gate corresponding to one of the plurality of storage locations in the memory device, each of said plurality of and-gates AND together said start-write-sequence signal, the corresponding bit within the valid flag register, and the corresponding write address decode line; and i. the logic circuit having a set-valid-flag-error register having a plurality of bits, each of the plurality of bits of the set-valid-flag-error register corresponds to one of said plurality of and-gates and is attached thereto.

4. An apparatus for checking integrity of a write operation of a memory device by controlling a read and a write pointer, the memory device being readable via a read operation, the memory device having a plurality of storage locations for storing a plurality of data elements, a corresponding data element stored in a particular one of the plurality of storage locations of the memory device being valid if a prior write operation is performed on the particular one of the plurality of storage locations and no later read operation is performed on the particular one of the plurality of storage locations, the apparatus comprising:

a. a memory controller coupled to the memory device for controlling the read and the write operation by controlling the read and write pointers;

b. first determining circuit coupled to said memory controller for determining whether the memory controller is performing a write operation on the particular one of the plurality of storage locations of the memory device when the particular one of the plurality of storage locations contains valid data;

c. second determining circuit coupled to said memory controller for determining whether the memory controller is performing a read operation on the particular one of the plurality of storage locations of the memory device when the particular one of the plurality of storage locations of the memory device does not contain valid data;

d. the second determining circuit having a valid flag register coupled to the memory device, the valid flag register having a plurality of bits wherein each bit corresponds to a particular one of the plurality of storage locations in the memory device, the write operation of said particular one of the plurality of storage location within the memory device by the memory controller sets the corresponding particular one of the plurality of bits in the valid flag register indicating valid data is contained therein;

e. the second determining circuit having a logic circuit coupled to said valid flag register and to the memory controller for determining when the memory controller is attempting to perform a read operation on the particular one of the plurality of storage locations of the memory device that does not contain valid data therein;

f. the logic circuit having a read address register coupled to the memory controller for storing a read address pointer, the read address pointer identifies a particular one of the plurality of storage locations within the memory device;

g. the logic circuit having a read address decoder coupled to the read address register for decoding the read address pointer into a plurality of decode lines wherein each of the plurality of decode lines corresponds to one of the plurality of storage locations within the memory device;

h. the logic circuit having a start-read-sequence line provided by the memory controller, the memory controller asserting the start-read-sequence line whenever a read sequence is started;

i. the logic circuit having a plurality of inverters coupled to the valid flag register for providing an inverted copy of the valid flag register contents;

j. the logic circuit having a plurality of and-gates, each and-gate corresponding to one of the plurality of storage locations in the memory device, each of said plurality of and-gates AND together said start-read-sequence line, the inverted copy of the corresponding bit within the valid flag register, and the corresponding read address decode line; and k. the logic circuit having a clear-valid-flag-error register having a plurality of bits, each of the plurality of bits of the clear-valid-flag-error register correspond to one of said plurality of and-gates and is attached thereto.

5. An apparatus for checking integrity of a write operation of a memory device by controlling a read and a write pointer, the memory device being readable via a read operation, the memory device having a plurality of storage locations for storing a plurality of data elements, a corresponding data element stored in a particular one of the plurality of storage locations of the memory device being valid if a prior write operation is performed on the particular one of the plurality of storage locations and no later read operation is performed on the particular one of the plurality of storage locations, the apparatus comprising:

a. a memory controller coupled to the memory device for controlling the read and the write operation by controlling the read and write pointers;

b. first determining circuit coupled to said memory controller for determining whether the memory controller is performing a write operation on the particular one of the plurality of storage locations of the memory device when the particular one of the plurality of storage locations contains valid data;

c. second determining circuit coupled to said memory controller for determining whether the memory controller is performing a read operation on the particular one of the plurality of storage locations of the memory device when the particular one of the plurality of storage locations of the memory device does not contain valid data;

d. third determining circuit coupled to said memory controller for determining whether the memory controller is performing a write operation and a read operation on a same particular one of the plurality of storage locations of the memory device;

e. the third determining circuit having a read address register coupled to the memory controller for storing a read address pointer, the read address pointer identifies a particular one of the plurality of storage locations within the memory device;

f. the third determining circuit having a read address decoder coupled to the read address register for decoding the read address pointer into a plurality of decode lines wherein each of the plurality of read decode lines corresponds to one of the plurality of storage locations within the memory device;

g. the third determining circuit having a write address register coupled to the memory controller for storing a write address pointer, the write address pointer identifies a particular one of the plurality of storage locations within the memory device;

h. the third determining circuit having a write address decoder coupled to the write address register for decoding the write address pointer into a plurality of decode lines wherein each of the plurality of write decode lines correspond to one of the plurality of storage locations within the memory device;

i. the third determining circuit having a start-read-sequence line provided by the memory controller, the memory controller asserting the start-read-sequence line whenever a read sequence is started;

j. the third determining circuit having a start-write-sequence line provided by the memory controller, the memory controller asserting the start-write-sequence line whenever a write sequence is started;

k. the third determining circuit having a plurality of and-gates, each and-gate corresponding to one of the plurality of storage locations in the memory device, each of said plurality of and-gates AND together said start-read-sequence line, said start-write-sequence line, the corresponding read address decode line, and the corresponding write address decode line; and l. the third determining circuit having a control-valid-flag-error register having a plurality of bits, each of the plurality of bits of the control-valid-flag-error register correspond to one of said plurality of and-gates and is attached thereto.

* * * * *